US009602472B2

(12) United States Patent
Nandi et al.

(10) Patent No.: US 9,602,472 B2
(45) Date of Patent: Mar. 21, 2017

(54) METHODS AND SYSTEMS FOR PRIVACY PROTECTION OF NETWORK END USERS INCLUDING PROFILE SLICING

(71) Applicant: Alcatel Lucent, Boulogne Billancourt (FR)

(72) Inventors: Animesh Nandi, Bangalore (IN); Armen Aghasaryan, Nozay (FR); Ishan Chhabra, Bangalore (IN); Makram Bouzid, Nozay (FR)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/406,998

(22) PCT Filed: May 31, 2013

(86) PCT No.: PCT/EP2013/061221
§ 371 (c)(1),
(2) Date: Dec. 10, 2014

(87) PCT Pub. No.: WO2013/186061
PCT Pub. Date: Dec. 19, 2013

(65) Prior Publication Data
US 2015/0156172 A1 Jun. 4, 2015

(30) Foreign Application Priority Data

Jun. 15, 2012 (IN) .......................... 1854/DEL/2012

(51) Int. Cl.
*H04L 29/06* (2006.01)
*G06Q 30/02* (2012.01)
(Continued)

(52) U.S. Cl.
CPC ..... *H04L 63/0421* (2013.01); *G06Q 30/0282* (2013.01); *G06Q 30/0631* (2013.01);
(Continued)

(58) Field of Classification Search
CPC ............ H04L 61/2061; H04L 61/6059; H04L 63/0428; H04L 29/12915
(Continued)

(56) References Cited

U.S. PATENT DOCUMENTS 6,266,704 B1 * 7/2001 Reed ....................... H04L 45/00
709/238
7,069,249 B2 * 6/2006 Stolfo .................. G06Q 10/087
705/64
(Continued)

FOREIGN PATENT DOCUMENTS

EP        2 426 891 A1    3/2012
FR   WO 2012146508 A1 * 11/2012   ......... G06Q 30/0282
(Continued)

OTHER PUBLICATIONS

"A Model of Onion Routing with Provable Anonymity", Feigenbaum et al., pp. 1-15, Dec. 2007.*
(Continued)

*Primary Examiner* — Haresh N Patel
(74) *Attorney, Agent, or Firm* — Fay Sharpe, LLP (57) ABSTRACT

Method(s) and system(s) for providing privacy to personal information of end users while utilizing recommendation services and personalized content are described. According to the present subject matter, the system(s) implement the described method(s) for providing privacy to personal information of end users. The method for privacy protection includes receiving user consumption data associated with one or more end users where the user consumption data comprises at least a slice of interest profile and associated interest group id of the slice of interest profile; and where the user consumption data is received through a network anonymization layer. The method may further include routing the user consumption data to an interest group aggregator node from amongst a plurality of intermediary nodes based
(Continued)

on distributed hash table routing mechanism, and wherein the interest group aggregator node is associated with the interest group id present in the user consumption data.

14 Claims, 4 Drawing Sheets

(51) Int. Cl.
  *G06Q 30/06* (2012.01)
  *H04L 29/08* (2006.01)
(52) U.S. Cl.
  CPC ...... *H04L 63/0435* (2013.01); *H04L 63/0471* (2013.01); *H04L 67/20* (2013.01); *H04L 67/22* (2013.01); *H04L 67/2833* (2013.01); *H04L 67/306* (2013.01)
(58) Field of Classification Search
  USPC .................................................. 713/153, 168
  See application file for complete search history.

(56) References Cited

U.S. PATENT DOCUMENTS

| | | | | |
|---|---|---|---|---|
| 7,457,946 | B2* | 11/2008 | Hind | H04L 63/0281 713/153 |
| 7,646,873 | B2* | 1/2010 | Lee | H04L 9/0852 380/277 |
| 8,010,676 | B1* | 8/2011 | Battersby | H04L 47/70 709/226 |
| 8,190,878 | B2* | 5/2012 | Stern | G06Q 10/107 713/153 |
| 8,700,705 | B2* | 4/2014 | Danezis | G06F 17/30522 709/204 |
| 8,817,595 | B2* | 8/2014 | Hautakorpi | G06F 9/5088 370/217 |
| 8,868,654 | B2* | 10/2014 | Guha | G06Q 30/08 709/204 |
| 8,943,201 | B2* | 1/2015 | Larson | H04L 63/10 709/225 |
| 9,176,579 | B2* | 11/2015 | Hyndman | A63F 13/537 709/206 |
| 2002/0133500 | A1 | 9/2002 | Arlein et al. | |
| 2003/0080997 | A1 | 5/2003 | Fuehren et al. | |
| 2006/0149708 | A1* | 7/2006 | Lavine | G06F 17/30477 709/237 |
| 2007/0067409 | A1* | 3/2007 | Eslambolchi | H04L 63/0281 709/217 |
| 2007/0250582 | A1* | 10/2007 | Sidhu | H04L 12/581 709/206 |
| 2008/0094220 | A1* | 4/2008 | Foley | G06Q 20/327 340/572.4 |
| 2008/0263353 | A1* | 10/2008 | Droms | H04L 29/12283 713/153 |
| 2009/0003353 | A1* | 1/2009 | Ding | H04L 45/64 370/395.53 |
| 2009/0216910 | A1* | 8/2009 | Duchesneau | G06F 9/5072 709/250 |
| 2009/0276522 | A1* | 11/2009 | Seidel | H04L 43/12 709/224 |
| 2009/0307296 | A1 | 12/2009 | Gibbs et al. | |
| 2009/0323972 | A1* | 12/2009 | Kohno | G06F 21/6245 380/284 |
| 2010/0002882 | A1* | 1/2010 | Rieger | H04L 63/0281 380/270 |
| 2010/0024028 | A1* | 1/2010 | Baugher | G06F 21/62 726/17 |
| 2010/0046507 | A1* | 2/2010 | Rosenberg | H04L 65/1006 370/352 |
| 2010/0082688 | A1* | 4/2010 | Davis | G06F 17/30044 707/E17.001 |
| 2010/0161817 | A1* | 6/2010 | Xiao | H04L 63/126 709/229 |
| 2010/0162263 | A1* | 6/2010 | Kamalahasan | G06F 11/3414 719/313 |
| 2010/0172236 | A1* | 7/2010 | Madrahalli | H04J 3/14 370/225 |
| 2010/0180116 | A1* | 7/2010 | Coan | H04L 9/0891 713/168 |
| 2010/0250589 | A1* | 9/2010 | Tsai | G06F 17/30575 707/770 |
| 2010/0277279 | A1* | 11/2010 | Kim | G06K 19/07309 340/5.85 |
| 2010/0318577 | A1* | 12/2010 | Camarillo | H04M 3/42365 707/802 |
| 2011/0016342 | A1* | 1/2011 | Rowan | G06F 11/3006 713/340 |
| 2012/0036187 | A1 | 2/2012 | Luboshitz et al. | |
| 2012/0066231 | A1* | 3/2012 | Petersen | G06F 17/30867 707/748 |
| 2012/0084349 | A1* | 4/2012 | Lee | G06Q 30/02 709/203 |
| 2012/0096546 | A1* | 4/2012 | Dilley | H04L 67/2804 726/22 |
| 2012/0166582 | A1* | 6/2012 | Binder | H04L 63/18 709/217 |
| 2012/0166583 | A1* | 6/2012 | Koonce | G06F 17/30861 709/217 |
| 2012/0197962 | A1* | 8/2012 | Maenpaa | H04L 67/104 709/201 |
| 2013/0054832 | A1* | 2/2013 | Umetsu | H04L 67/104 709/238 |
| 2013/0097320 | A1* | 4/2013 | Ritter | G06Q 10/06 709/226 |
| 2013/0122854 | A1* | 5/2013 | Agarwal | H04L 12/141 455/405 |
| 2013/0151653 | A1* | 6/2013 | Sawicki | G06F 15/17331 709/216 |
| 2013/0191463 | A1* | 7/2013 | Thubert | H04L 61/6059 709/206 |
| 2013/0239231 | A1* | 9/2013 | Korycki | H04L 67/02 726/29 |
| 2013/0332608 | A1* | 12/2013 | Shiga | G06F 9/5088 709/226 |
| 2014/0223575 | A1* | 8/2014 | Nandi | G06Q 30/0282 726/27 |

FOREIGN PATENT DOCUMENTS

| | | | |
|---|---|---|---|
| JP | 2004-503875 | A | 2/2004 |
| JP | 2005-506637 | A | 3/2005 |
| JP | 2011-138398 | A | 7/2011 |

OTHER PUBLICATIONS

"Improving efficiency and simplicity of Tor circuit establishment and hidden services", Overlier et al., pp. 1-20, Dec. 2007.*
Antony Rowstron et al., "Pastry: Scalable, Decentralized Object Location, and Routing for Large-Scale Peer-to-Peer Systems," Middleware 2001, Lecture Notes in Computer Science, pp. 329-350, XP019074040, Nov. 12, 2001.
Paul F. Syverson et al., "Anonymous Connections and Onion Routing," Security and Privacy, IEEE, pp. 44-54, XP010230141, May 4, 1997.
Armen Aghasaryan et al., "A Profiling Engine for Converged Service Delivery Platforms," Bell Labs Technical Journal, vol. 13, No. 2, pp. 93-103, XP001514352, Jun. 21, 2008.
International Search Report for PCT/EP2013/061221 dated Aug. 21, 2013.

* cited by examiner

METHODS AND SYSTEMS FOR PRIVACY PROTECTION OF NETWORK END USERS INCLUDING PROFILE SLICING

FIELD OF INVENTION

The present subject matter relates to communication systems and, particularly but not exclusively, to privacy protection of end users while providing recommendation services.

BACKGROUND

Owing to the huge mass of content available over the World Wide Web, end users accessing content provided by service providers are often provided assistance by the service providers, search engines, web publishers, and advertisers in making a selection of content. Conventionally known techniques, such as content based recommendation, collaborative recommendation, etc., are used to generate recommendations to enable such selection by the end users. In content based recommendation, the end users are recommended content, services or products which are similar to the content, services or products used or liked by the end users in the past or which match the interest or choice of the end user. In collaborative recommendation, the end user is recommended content, services or products which are similar to the content, services or products used or liked by other end users having similar or same interest or choices. In an example of content based recommendation, a movie review website may monitor an end user to regularly view a certain category of movies, for example animated movies. Accordingly, every time an animated movie is available for view, the end users may be provided a recommendation, such as a notification or an alert, for example, to download the movie by making relevant payments.

Similarly, in collaborative recommendation, also known as collaborative filtering, service providers may provide targeted advertisements to an end user where these advertisements pertain to product or services that have been preferred by other end users that have similar interests and preferences as the end user. For example, an internet protocol television (IPTV) service provider may recommend television shows or movies to the end user, if the television shows or movies have been viewed by other end users whose interests match the interests of the end user.

In midst of all these techniques for providing assistance and offering relevant content to the end users, users of today are feeling increasingly concerned of their personal and potentially sensitive information. For example, an end user of an e-store may not object to the use of his ordering history or ratings to make anonymous recommendations to other end users, but the end user may not want the other end users to know the particular items that the end user purchased or rated.

SUMMARY

This summary is provided to introduce concepts related to privacy protection of end users for providing recommendation services. This summary is not intended to identify essential features of the claimed subject matter nor is it intended for use in determining or limiting the scope of the claimed subject matter.

In one implementation, a method to provide privacy protection to end users for providing recommendation services is described. The method includes receiving user consumption data, associated with one or more end users where the user consumption data comprises at least a slice of interest profile and an associated interest group id of the slice of interest profile; and where the user consumption data is received through a network anonymization layer. The method further includes routing the user consumption data to an interest group aggregator node from amongst a plurality of intermediary nodes based on distributed hash table (DHT) routing mechanism, and where the interest group aggregator node is associated with the interest group id present in the user consumption data.

In another implementation, a privacy protection system to protect privacy of end users in a network comprising a privacy protection middleware system connected to at least one local client is described. The privacy protection middleware system includes a plurality of intermediary nodes where at least one intermediary node implements a backend middleware system. The backend middleware system may include a processor and, a memory coupled to the processor. The memory may include a networking module configured to receive user consumption data, from the at least one local client of at least one end user, where the user consumption data comprises at least a slice of interest profile and associated interest group id of the at least one end user; and where the user consumption data is received through a network anonymization layer. The memory may further include a routing module configured to route the user consumption data to an interest group aggregator node from amongst the plurality of intermediary nodes based on DHT routing mechanism, where the interest group aggregator node is associated with the interest group id of the user consumption data.

In another implementation, a computer-readable medium having embodied thereon a computer readable program code for executing a method is described. The method may include receiving user consumption data, associated with one or more end users is received where the user consumption data comprises at least a slice of interest profile and associated interest group id of the slice of interest profile; and where the user consumption data is received through a network anonymization layer. The method further includes routing the user consumption data to an interest group aggregator node from amongst a plurality of intermediary nodes based on distributed hash table (DHT) routing mechanism, and where the interest group aggregator node is associated with the interest group id present in the user consumption data.

BRIEF DESCRIPTION OF THE FIGURES

The detailed description is described with reference to the accompanying figures. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

DESCRIPTION OF EMBODIMENTS

Systems and methods for providing privacy to personal information of end users are described. The systems and methods can be implemented in various distributed servers and communication devices communicating through various networks. The distributed servers and computing systems that can implement the described method(s) include, but are not limited to, central directory servers, database server, file server, print server, web server, application server, notebooks, tablets, personal computers, set top devices, mobile phones and the like. Although the description herein is with reference to personal computers and distributed servers providing recommendation services, the methods and systems may be implemented in other server and computing systems providing connectivity to the end users for protecting their privacy, as will be understood by a person skilled in the art.

Although recommendation services and personalized content are provided to different end users by service providers through various networks, the methods and systems described herein are access independent, and support multiple access types including Global System for Mobile (GSM), Wideband Code Division Multiple Access (W-CDMA), Code Division Multiple Access (CDMA), Wireless Local Area Network (WLAN), Wireline, Local Area Network (LAN), and other networks providing connectivity.

In one embodiment, the present subject matter discloses a system and a method for privacy protection to protect personal and private information of the end users using their client devices to avail services or view content recommended by a service provider through a network.

Conventionally, many service providers attempt to personalize the services provided to end users, such as services of providing content including videos, audio, news, advertisements, etc., based on personal details, preferences and choices of the end users. For this purpose, the service provider use techniques, such as content based recommendation and/or collaborative recommendation to recommend services, contents, or products that might be of interest to an end user based either on personal information of the end user such as, age, sex, and location of the end user; on the past actions of the end user, or past preferences by other end users who have been identified to have similar interests as that of the end user.

For example, in the conventional content based recommendation approach if an end user, say user A, has purchased a book written by a particular author, the service provider may suggest the user A to purchase other books written by the same author or other books on the same or related subjects, etc. In a similar but another conventional approach, namely the collaborative recommendation approach, the service provider determines other end users who may have an interest profile similar to that of end user A and recommend contents, or products that have been preferred by the other end users to the end user A. For the purpose, creation of interest profiles of a plurality of end users and matching the interest profiles of the end users to ascertain interest groups of end users who have similar interests is carried out using conventionally known methods. Similarly, the interest profile of an end user may also be segmented into different slices based on the end user's interests and activities. For example, if say the entire browsing history comprises an end user's interest profile, then a slice of the interest profile may be a small subset containing only a few unified resource locators (URLs). Thus the entire interest profile of the end user may be split into multiple small profile slices to ensure that each slice of the interest profile is small enough such that it does not by itself reveal enough information to infer the identity of the user. Slicing of interest profile of end users is carried out using conventional known methods. Details conventionally known in the art are omitted for the sake of brevity.

In another example, if an end user, say user B, is interested in adventure sports, the service provider tries to find other end users who are also interested in adventure sports. If any of the other end users who are interested in adventure sports perform any activity, the service provider would suggest the user B to perform the same activity, even though user B may not have explicitly expressed his interest in the activity. This conventional approach assumes that end users, who have similar interest profiles, i.e., similar interests, have a high probability of having the same personal preferences.

The conventional techniques implemented by the service provider require collection of information related to personal preferences, choices, etc., of the end users. Conventionally, the service providers monitor and collect information pertaining to the end users through various means, such as by analyzing log files, application history files or other personally identifiable information saved on the end user's client device. In another conventional technique, the service provider may save a text file, such as a Hyper Text Transfer Protocol (http) cookie to collect information pertaining to an end user. For example, a web portal may save user preference data including an http cookie of a web browser of an end user to store the preferences of the end user such as font size, arrangement of display widgets, etc. Further, the user preference data may also store the browsing details of the end user and send the same to the web portal.

Thus, in an attempt to provide recommendation services, personalized content, services or products to the end user based on the end user's personal choice, the service provider often monitors and collects information pertaining to activities of the end user. In certain situations, it becomes possible to identify the end user on the basis of the information collected by the service providers. This may result in compromising the personal or confidential information of the end user and exposes the end user to potential privacy breaches or makes him the target of advertisers or spammers, etc. Further, in extreme cases, the end user may be a victim of various crimes such as identity theft, credit card frauds, etc.

Further, in present days when end users are connected to each other users through virtual social networks via high speed communication support, end users are constantly sharing private and personal information to a broad class of applications such as, StumbleUpon©, GoogleNews™, Foursquare®, Facebook®, Yahoo!®, and Twitter™. Although the nature of sensitive personal information revealed depends on the type of application such as, location for location based services (LBS) and browsing history for uniform resource locator (URL) recommender systems; infusion of these applications into the all-encompassing framework of Online Social Networks (OSNs), wherein OSNs are beginning to act as a 'one-stop-shop' for offering recommendation services, is putting the personal information of users at higher risks than ever.

Recently, different approaches to preserve privacy, while still providing recommendation services; personalized content, and services have been proposed. These approaches vary depending on the application scenario, from LBS, to recommender systems, and OSN.

One of such existing approach is based on a centralized solution offering privacy of personal information to end users. In such a centralized solution, a single trusted intermediary provides request and receives recommendations from service providers on behalf of the end users to keep the private information of end users safe and identity of end users anonymous to the content and service providers. However, such centralized solutions are based on an unpractical assumption of trust model where the single trusted intermediary is trusted to not maliciously use the end users information.

Further, certain approaches provide centralized solution where centralized intermediaries are un-trusted by the end users. In such situation, to provide anonymity to end users from the un-trusted centralized intermediary, the information communicated between end users is encrypted with encryption keys mutually shared between the end users, such that the data received by the intermediary is in encrypted form and can only be decrypted by the intended recipient which is another end user that is known apriori, e.g. social friends in an online social network. However this approach excludes the use of business models and applications by the centralized intermediaries, which require communication such that the data in the information exchanged when viewed by the intermediary is in un-encrypted form. For example, in certain instances, service providers wish to provide ads matching to the interest of end users based on the aggregated consumption data. Such applications cannot be supported in these centralized solution approaches.

Similarly, in other approaches where the centralized intermediaries are un-trusted yet provide services such as recommendation services to end users. To provide personalized content and recommendation service, the centralized intermediaries may anonymously receive end users consumption data related to their preferences and personal interests. However, typical interests of the anonymous end users over a period of time can be monitored to segregate an end user and link the end user to a specific person based on his such typical interests identified from the user consumption data. In such situations the personal and private information of the end user is at high risk and can be misused. Hence, these centralized solutions are prone to linkability attacks since they do not support decentralized intermediaries.

Another solution to protect private information of users realizing the de-centralized intermediary approach is the use of distributed hash table (DHT) based anonymous publishing and subscribing techniques which can leverage un-encrypted communication between the end users and the de-centralized multiple intermediaries. These techniques allow the end users to anonymously upload (subscribe) personal interest and also anonymously receive information provided (published) by the service provider. Although the use of DHT based techniques allows end users anonymity, however, DHT techniques are not supported by thin clients having limiting computing capability, such as mobile devices. Thin clients are primarily not supported since DHT techniques requires all clients to be part of the DHT routing mechanism itself, as would be understood by those skilled in the art. Further, since end users are part of the implemented DHT technique, fluctuating connectivity of end users with the network does not provide stable participation of the end users, in-turn degrading the performance of the entire personalized content and recommendation-service providing systems. Therefore, direct implementation of such DHT techniques fail to support a large number of operating scenarios of today's privacy preserving personalization services, especially where the end users are connected through mobile devices.

Therefore, the existing solutions either provide limited protection due to trust considerations or provide support for limited applications and devices due to choice of encrypted/un-encrypted data and support to limited type of computing devices.

According to an implementation of the present subject matter, systems and methods for providing true privacy to personal information of end users are described. In one implementation, the systems and methods described herein are based on de-centralized solution for privacy protection offering a distributed collection of largely non-colluding intermediaries that support thin clients and do not necessitate use of encrypted data for communication, such as where the data is encrypted in a manner that only the recipient can decrypt and view the data. The described systems and methods also provide privacy to personal information of end users for different and varied application scenarios, such as, LBS, recommender systems, and OSNs. According to one embodiment of the subject matter, the systems and methods described herein may be implemented in various scenarios where the users may either be connected through a network through wired networks or through wireless networks provided via different means. As described before, the systems and methods can be implemented in a variety of processing and communicating devices capable of communicating with a network according to various different standards defined for the communication.

The systems and methods as described herein, on one hand, provide true protection to private information of the end users by providing anonymity to each end user and their private information without limiting the use of applications and business models, and on the other, also provide the end user with capability of utilizing any computing device including a thin client such as a mobile device with limited computational capability to receive personalized content and recommendation services. In one embodiment, a privacy protection system includes a plurality of end users with local client and a privacy protection middleware system.

In Accordance with one embodiment of the subject matter, to provide personalized content and recommendation services through de-centralized approach to an end user, interest profile of the end user is generated based on the personal choices and preferences of the end user. Based on the interest profile of end users, interest groups to which the end user can be associated with are identified. In one embodiment, the local client installed on the client device of the end users may evaluate the interest profile and the interest group associated with the end users based on various application scenarios, such as LBS, recommender systems, and OSNs. Examples of such client devices include, but are not restricted to, computing device, such as mainframe computers, workstations, personal computers, desktop computers, minicomputers, servers, multiprocessor systems, and laptops; cellular communicating devices, such as a personal digital assistant, a smart phone, a mobile phone; and the like. Further, the interest profile and the interest group may be evaluated based on logic implemented as a software tool, firmware, application plug-in, and the like.

The local client may generate an interest profile of the end user based on the personal choices and preferences of the end user collected through various applications. In said implementation, the interest profile generation may be based on compilation of information with various applications through an application programming interface (API) to determine and analyze the personal choices and preferences of the end user. Since the method of generating interest profile is known in the art, the description of the same is excluded for the sake of brevity.

In another implementation, the local client may store the information pertaining to the end user as a set of key-value pair, where the key stores items, or category or tags associated with the items. For example, metadata associated with items like websites, songs, videos, etc., is stored as keys. At the same time, the value corresponding to a key is also stored. The valve is indicative of an interest level of the end user in the corresponding key.

The various sets of key-value pairs may then be analyzed to determine a probable group to which the end user may pertain to, based on techniques known in the art. For example, in one implementation, the meta-tags based on the various sets of key-value pair may be generated and these meta-tags may be compared to a pre-defined list of interest groups and a group identity (id) indicative of the group to which the end user pertains to may be determined. End users who have similar or same interests are categorized into the same group using conventional techniques such as local sensitivity hashing (LSH) techniques or semantic based clustering, etc. Further an end user may be categorized into one or more interest groups. For example, an end user C, interested in items X and Y, may be categorized into a group represented by say group id 100 and 200, wherein another end user, user D interested in items X, Y and Z, may be categorized into say two interest groups represented by say group id 100, 200 and 300. It should be appreciated that the processing done by the local client and the data generated as a result thereof; may not be transmitted outside the computing device of the end user.

In an example, an end user, say A, utilizing an Internet Protocol Television (IPTV), personal information may be compiled based on shows watched, shows recorded, and alarms set for the shows by the end user A. The end user A may watch cookery shows, record shows related to new and varied recipes, and store alarms for prominent travel shows. Further, based on personal choice, the end user A may also have subscribed to content category cookery and lifestyle from the service provider of the IPTV. Based on such gathered information, the local client of the end user may identify the end user to have interest in cookery and lifestyle and; may associate the end user A to interest group cookery and lifestyle with interest group ids 09 and 54.

Further, in another implementation of the present subject matter, the association of interest group and corresponding interest group id with end users may also be based on different application scenarios utilized by different end users. For example, as explained above for IPTV applications, an interest group id may be associated with an end user depending on the interest group to which the end user best fits in, wherein the interest groups may be pre-defined based exhaustive list of end users-choices and their classifications.

Similarly, for LBS applications, end users may be associated with different interest groups and corresponding interest group ids, not based on classified user-choices, but on the current location of the end user. For example an end user W roaming in an area $\alpha$ of a city and utilizing LBS may be associated with an interest group $\alpha$ and interest group id 22. Similarly, all end users roaming in an area $\gamma$ of the city and utilizing LBS may be associated with an interest group $\gamma$ and a corresponding interest group id 68. In one implementation, the interest groups for LBS may be based on latitude and longitude of the position of the end users. Further, similarly for OSNs, the interest groups can be based on social circle (or communities) of the end user where the social circles may group different end users with similar interests, ethnicity, region, and religion. It would be understood that different social circles on OSNs allow end users to share their interests, and thoughts; and also communicate among each other through various means, such as instant messages and e-mails.

It would be appreciated by those skilled in the art that the interest groups to which end users are associated with may be modified and updated from time to time based on changing end user choices and end users requests. The end users may be also be shifted from one interest group to another based on changes in the interest profile. Further, it would be appreciated that in situation of LBS, the interest group of end users may be updated from time to time based on end users current location. Also, the local client may also choose an interest group for an end user based on information collated from two or more application scenarios. For example, if an end user M is associated with interest group cookery-and-lifestyle and is also utilizing LBS in an area a, the user M may be associated with an interest group # having other end users with similar interest and roaming in the same area.

In one implementation of the present subject matter, the client device of the end user is connected to the privacy protection middleware system either directly or through the network. The local client installed on the client device may instantiate different middleware APIs to use for the interaction with the privacy protection middleware system based on the application requirements.

The privacy protection middleware system includes a distributed collection of largely non-colluding intermediary nodes that support thin clients and do not necessitate data encryption where only the intended recipient can decrypted the data for viewing. The intermediary nodes of the privacy protection middleware system may be one or more of workstations, personal computers, desktop computers, multiprocessor systems, laptops, network computers, minicomputers, servers and the like. These intermediary nodes may pertain to the computing resources of one or more client devices, and has the capability to be collaboratively hosted. Also, the privacy protection middleware system may also run on intermediary nodes donated by or hosted by one or more non-colluding third parties.

In one implementation, the privacy protection middleware system implements a de-centralized solution of distributed intermediary nodes for privacy protection where end users associated with same interest group ids anonymously rendezvous their user consumption data at some common intermediary node from among the pool of distributed intermediary nodes to receive personalized content and recommendation services. Each intermediary node hosts an interest group associated with corresponding interest group id to enable delivery of personalized content and support of recommendation services, pertinent to the nature of the interest group, to the associated end user.

For example, local client of end user A and B, associated with the same interest group id 156 based on their interest profile, may rendezvous their consumption data at a common intermediary node R. Further, the local client of end user A may also have associated him with another interest group id 190 based on his interest, wherein the interest group id 190 is hosted by another intermediary node S of the privacy protection middleware system. In such a scenario, other end users D, F and J who may also associated with the interest group id 190 based on similar interests, by their respective local clients, in turn be also associated with the same intermediary node S. Further, in said example, if the interest group id 190 may relate to category sports and therefore, the intermediary node S hosting the interest group id 190 may enable delivery of sports content and recommendation services related to sports to the end user, A, D, F and J.

According to an implementation of the present subject matter, the privacy protection middleware system implements a group of functionalities to provide true privacy protection to the end users. The functionalities implemented by the privacy protection middleware system are described with respect to different layers for the ease of understanding and explanation in the description. The different layers instantiate different frameworks to support the said functionalities.

The privacy protection middleware system implements a layer of network anonymization. The network anonymization layer enables the end users to communicate with the privacy protection middleware system's intermediary nodes anonymously while still allowing the middleware intermediary node to have user consumption data of end users in un-encrypted form through encrypted channels. On one hand, the anonymization network layer supports anonymity of end users, on the other, also allows the privacy protection middleware system to anonymously deliver PUSH recommendations. It would be understood by those skilled in the art that PUSH recommendations are content provided to the end users without explicit request initiated by the end users.

In one implementation, the network anonymization layer of the privacy protection middleware system utilizes client/relay based routing mechanism, such as onion routing mechanism. In another implementation, The Onion Router (TOR) framework may be utilized to provide anonymity to the end users. Implementation of the TOR framework allows routing of private and confidential data of end users through the network of intermediary nodes acting as bouncing servers in order to conceal the end user's location and identity of any end user. Further, the use of TOR framework in the anonymization layer allows support to thin clients, such as the mobile devices. Therefore, apart from providing anonymity to end users, the use of network anonymization layer also provides flexibility of use of communication devices of various types to the end users. Although, it has been described that the network anonymization layer utilizes TOR framework, it would be appreciated that any other framework providing similar functionality as that of TOR could be implemented in the network anonymization layer of the privacy protection middleware system.

In another implementation of the present subject matter, the privacy protection middleware system also implements a routing and mapping layer. In said implementation, the routing and mapping layer of the privacy protection middleware system is implemented to determine an intermediary node corresponding to an interest group id. As described, since different intermediary nodes cater to different interest groups and corresponding interest group ids, the routing and mapping layer determines the intermediary node corresponding to each interest group. According to an implementation of the present subject matter, PASTRY framework is utilized for implementing the routing and mapping functionality based on DI-IT routing for the routing and mapping layer of the privacy protection middleware system. Although, it has been described that the routing and mapping layer utilizes PASTRY framework for DHT routing however, it would be appreciated that any other framework providing similar functionality as that of PASTRY framework could be implemented in the routing and mapping layer of the privacy protection middleware system.

According to another implementation, the privacy protection middleware system also implements an API layer to enable interaction between the local clients and the privacy protection middleware system. In said implementation, the API layer may implement subscribe, upload, receivePUSHRecommendation, and lookupPULLRecommendation APIs. The subscribe API may be instantiated by the end users to subscribe to an interest-group through the local client. The upload API, may be instantiated by the local client to upload a slice of the interest profile of the end users. Receive PUSH recommendations may be instantiated by an intermediary node to send PUSH recommendations to the local clients of end users based on the nature of the hosted interest groups. Further, the lookup PULL recommendation may be instantiated by intermediary nodes to receive PULL recommendations via explicitly initiated requests of the local client. In one implementation, the API layer implements Simple Object Access Protocol (SOAP) based web services to support the described APIs in the privacy protection middleware system. The SOAP based web services are Hypertext Transfer Protocol (HTTP) based web services that can be invoked anonymously over the underlying network anonymization layer implementing the TOR framework. Further, the HTTP based SOAP web services can be invoked in a seamless way by pointing the clients to the SOCKS proxy of TOR framework, which also supports HTTP traffic being relayed over TOR. Although, it has been described that the interaction between the local clients and the privacy protection middleware system is based on SOAP web services APIs however, it would be appreciated that any other web services providing similar functionality as that of SOAP web services could be implemented in the API layer of the privacy protection middleware system.

In another implementation of the present subject matter, the privacy protection middleware system may also include a persistent storage layer to store user consumption data provided by the local clients of end users based on interest profile the end users. The implementation of the persistent storage layer may allow the privacy protection middleware system to cope up with the churns caused due to modification and updation in intermediary nodes of the privacy protection middleware system. In operation, each intermediary node hosting a particular interest group may store the user consumption data of different users for future instances, such as, when the user consumption data is lost by the intermediary node, or when the intermediary node is not down and another intermediary node initiates the hosting of the group. In such instances, retrieval of user consumption data from intermediary nodes through persistent storage layer data may allow quick and non-cumbersome collation rather than receiving the user consumption data again from all the end users. In other words, under churn, a new intermediate node should be able to retrieve the previously uploaded user consumption data of the interest group.

However, in one implementation, to prevent linkability attacks, such as a rare URL appearing in different groups, the user consumption data may be segregated and stored on different intermediary nodes such that no single intermediary node receives the entire user consumption data of another intermediary node to view the entire persistent user consumption across that group. In said implementation, to ensure integrity of the user consumption data stored at different intermediary nodes, the intermediary node prior to storage of the user consumption data may also encrypt the data based on a group's symmetric encryption key where the user consumption data stored across different intermediary nodes can only be decrypted through the group's symmetric encryption key held by the intermediary node of that interest group.

It would further be appreciated that in situations of data corruption or loss of data at the intermediate node, the intermediate node may recover the user consumption data from different intermediate nodes based on the available group's symmetric encryption key. However, in situations where the intermediate node is down and not working, any other node assuming the hosting of the interest group of the down intermediary node should posses the group's symmetric encryption key to recover the user consumption data from different intermediate nodes through the persistent storage layer. For this purpose, each intermediate node may also communicate the group's symmetric key to one or more eligible intermediary node replicas, i.e., ones designated as per the DHT protocol using a DHT replication protocol such that the eligible intermediary node replica on hosting the interest group of the down intermediary node may retrieve the previously aggregated group consumption.

In one implementation, the persistent storage layer may utilize CASSANDRA framework for storage of user consumption data. Although, it has been described that the persistent storage layer utilizes CASSANDRA framework for storage of user data however, it would be appreciated that any other framework providing similar functionality as that of CASSANDRA framework could be implemented in the persistent storage layer of the privacy protection middleware system.

Each intermediary node of the privacy protection middleware system may instantiate one or more of the above described layers for implementation of the group of functionalities. Each intermediary node may also implement other layers and logics to supplement functionalities other than the described.

The privacy protection system described herein provides mechanisms that enable end users of a similar interest group (i.e. having common interest) to anonymously rendezvous at a common intermediary node, anonymously upload their consumption data to this intermediary node, persistently store the aggregated group consumption, and also receive the recommendations computed at the rendezvous node via an anonymous mechanism. Additionally, the privacy protection system provides flexibility to end users for the use of thin clients such as mobile devices. Hence, the privacy protection system provides functionalities that expose interfaces and APIs to a wide range of application scenarios.

It should be noted that the description and figures merely illustrate the principles of the present subject matter. It will thus be appreciated that those skilled in the art will be able to devise various arrangements that, although not explicitly described or shown herein, embody the principles of the present subject matter and are included within its spirit and scope. Furthermore, all examples recited herein are principally intended expressly to be only for pedagogical purposes to aid the reader in understanding the principles of the present subject matter and the concepts contributed by the inventor(s) to furthering the art, and are to be construed as being without limitation to such specifically recited examples and conditions. Moreover, all statements herein reciting principles, aspects, and embodiments of the present subject matter, as well as specific examples thereof, are intended to encompass equivalents thereof.

It will also be appreciated by those skilled in the art that the words during, while, and when as used herein are not exact terms that mean an action takes place instantly upon an initiating action but that there may be some small but reasonable delay, such as a propagation delay, between the initial action and the reaction that is initiated by the initial action. Additionally, the word "connected" and "coupled" is used throughout for clarity of the description and can include either a direct connection or an indirect connection.

Figure 1:
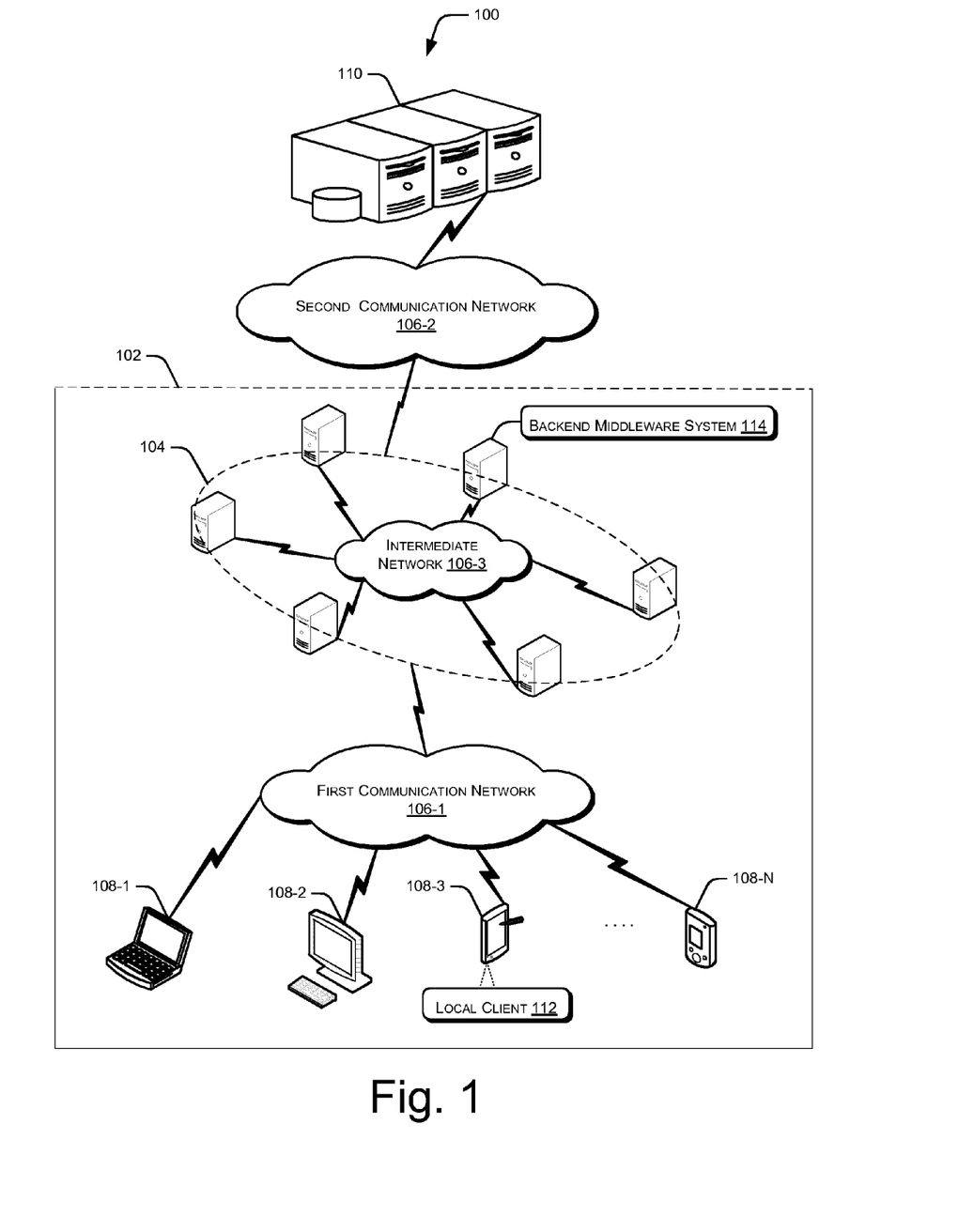
FIG. 1 illustrates an exemplary network environment implementation of a privacy protection system, according to an embodiment of the present subject matter.
Figure 2A:
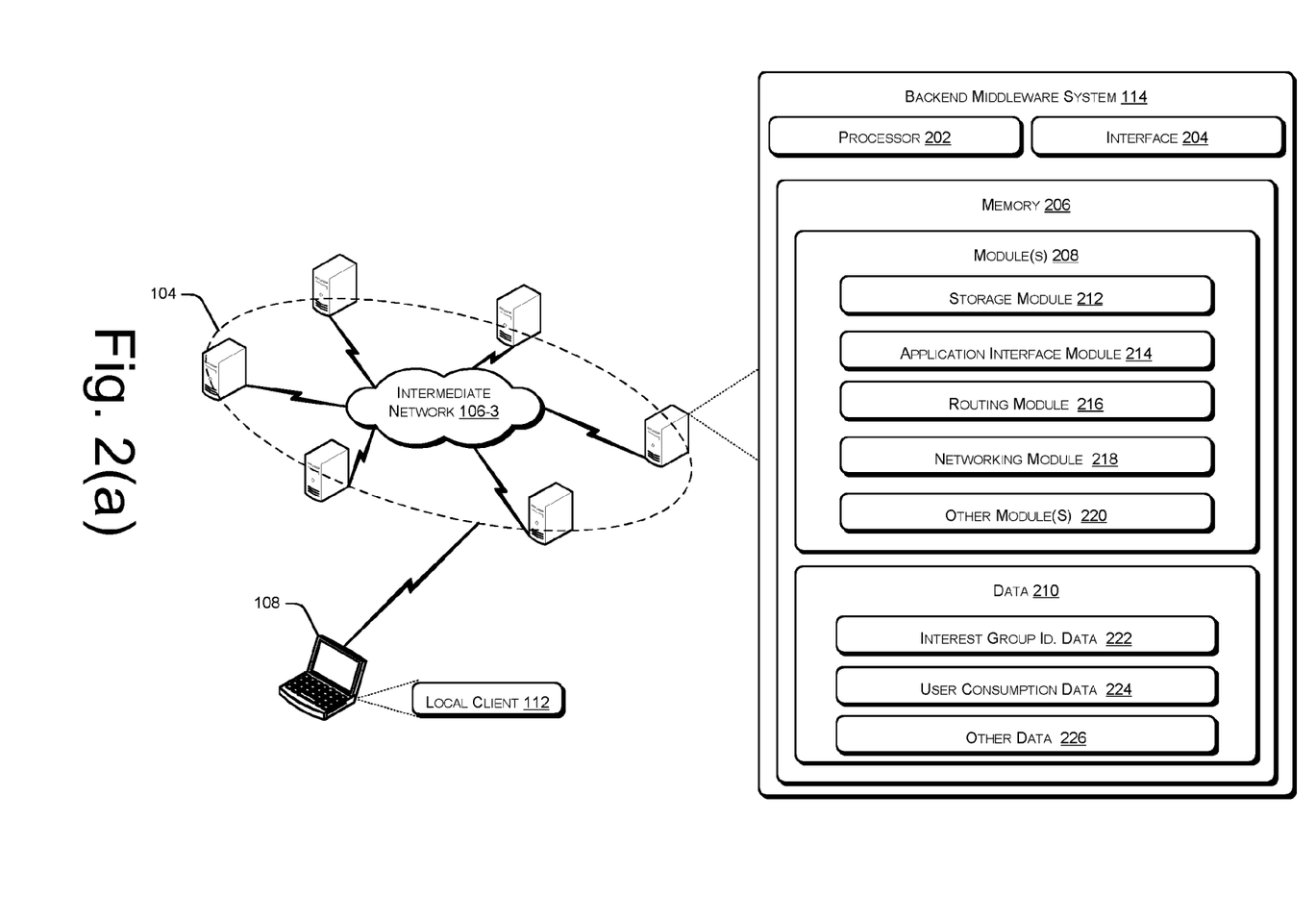
FIG. 2(a) schematically illustrates components of a privacy protection middleware system, in accordance with an embodiment of the present subject matter.
Figure 2B:
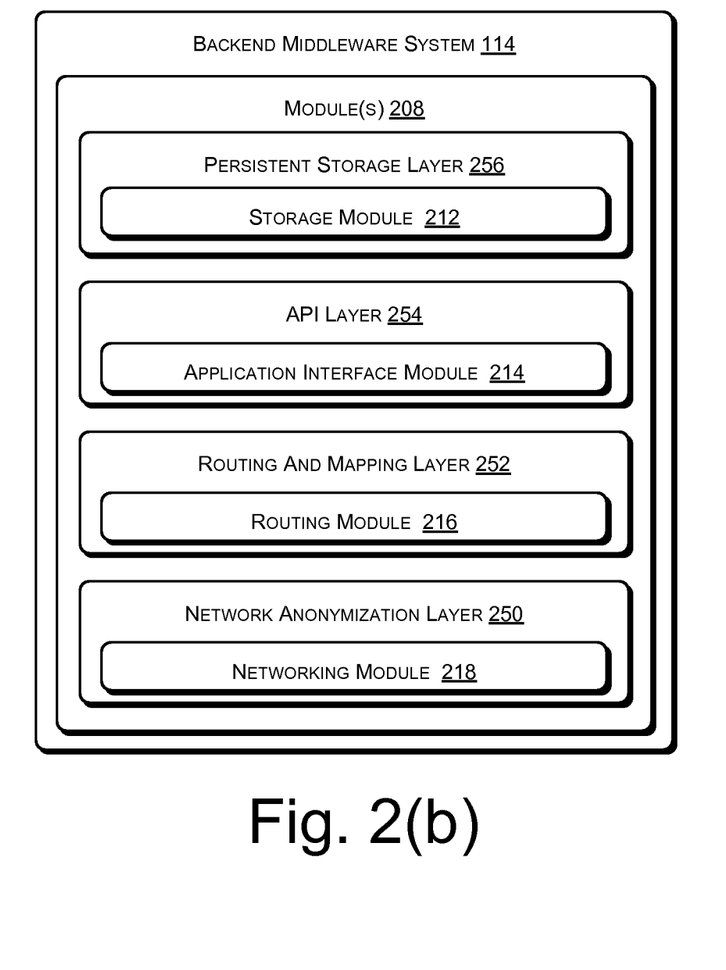
FIG. 2(b) schematically illustrates components of a back-end middleware system, in accordance with an embodiment of the present subject matter.
Figure 3:
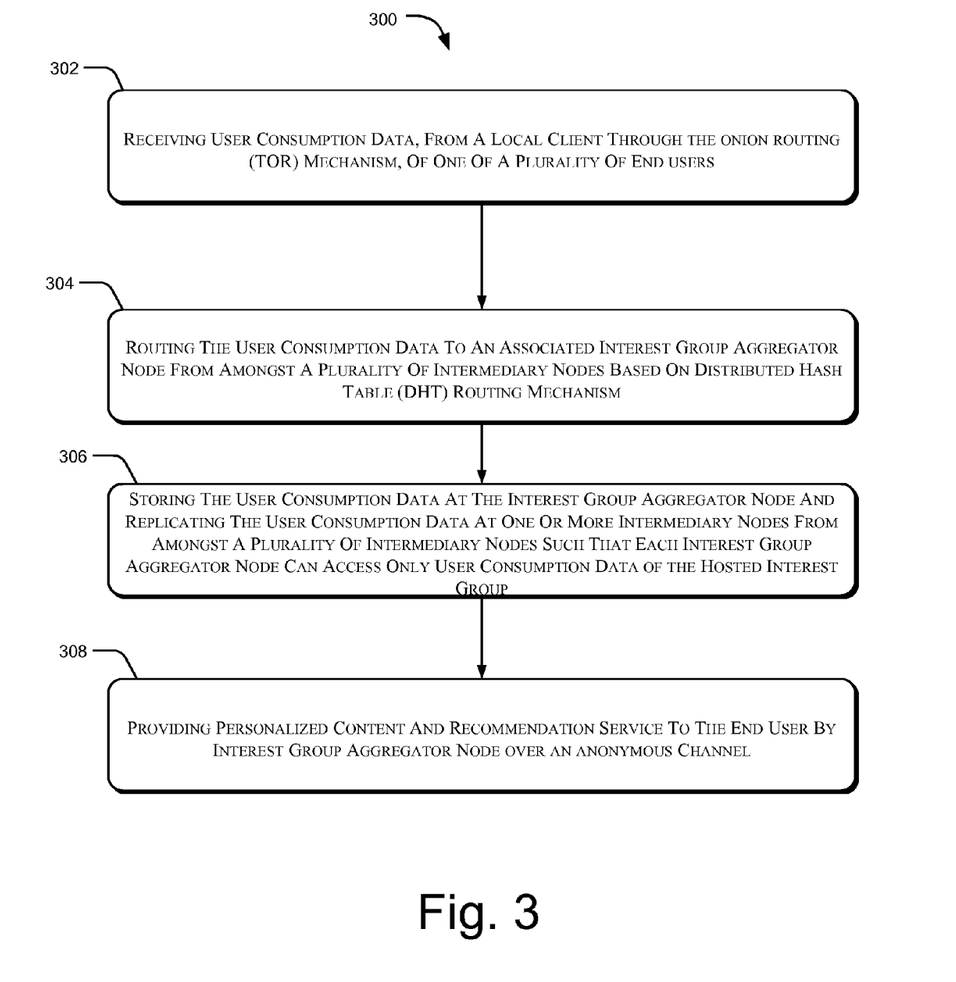
FIG. 3 illustrates a method to provide privacy protection to end users, in accordance with an embodiment of the present subject matter; and In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The manner in which the systems and methods of providing privacy protection to end users shall be implemented has been explained in details with respect to the FIGS. 1-3. While aspects of described systems and methods for providing privacy protection can be implemented in any number of different computing systems, transmission environments, and/or configurations, the embodiments are described in the context of the following exemplary system(s).

FIG. 1 illustrates a network environment 100 implementation of a privacy protection system 102 for privacy of personal and private information of end users while accessing personalized content and recommendation services, in accordance with an embodiment of the present subject matter. The privacy protection system 102 described herein, can be implemented in any network environment comprising a variety of network devices, including routers, bridges, servers, computing devices, storage devices, etc. In one implementation the privacy protection system 102 includes a privacy protection middleware system 104, connected through a first network 106-1 to one or more client devices 108-1, 108-2, 108-3, . . . , 108-N, individually and commonly referred to as client device(s) 108 hereinafter.

The privacy protection middleware system 104 can be implemented as a variety of computing devices such as a laptop computer, a desktop computer, a notebook, a workstation, a mainframe computer, a server and the like. Although the privacy protection middleware system 104 is shown as an entity, the privacy protection middleware system 104 may also be implemented as a distributed computing system including multiple intermediary nodes distributed over a network where each node can be implemented as a computing devices such as a laptop computer, a desktop computer, a notebook, a workstation, a mainframe computer, a server and the like. Further, the intermediary nodes may be connected through an intermediate network 106-2 for the purpose of communications and exchange of data.

The privacy protection middleware system 104 may also be connected to another second intermediate network 106-2, to exchange information with different service providers 110. For the sake of simplicity, the first network 106-1, the intermediary network 106-3 and the second network 106-2 are individually and commonly referred to as network(s) 106 hereinafter.

The networks 106 may be wireless networks, wired networks, or a combination thereof. The networks 106 can be a combination of individual networks, interconnected with each other and functioning as a single large network, for example, the Internet or an intranet. The networks 106 may be any public or private network, including a local area network (LAN), a wide area network (WAN), the Internet, an intranet, a peer to peer network and a virtual private network (VPN) and may include a variety of network devices such as routers, bridges, servers, computing devices, storage devices, etc. Further, it would be appreciated that the first network 106-1, the intermediary network 106-2, and the third network 106-3 may implement same or different networks and may in turn implement same or different communication protocols, respectively. For example, the first network 106-1 may implement a GSM/UMTS based network while the intermediary network 106-2, and the third network 106-3 may implement a CDMA based network. In another example, the first network 106-1 the intermediary network 106-2, and the third network 106-3 may be the same network, such as the Internet.

Each of the client devices 108 may implement a local client 112 to exchange information between respective client device 108 and the privacy protection middleware system 104 through the network 106. It will be appreciated, that the local clients are applications or functional modules that run on the client devices 108. As described earlier, the client devices 108 are used by end users to avail services or view content provided by the service providers 110. The client devices 108 may include computing devices, such as a laptop computer, a desktop computer, a notebook, a workstation, a mainframe computer, a set top box, a media player, and thin clients like mobile phone and personal digital assistant. The client devices 108 facilitate the end users to exchange information with the privacy protection middleware system 104 over the network 106. Further, the privacy protection middleware system 104 may be connected to the service provider 110 over the network 106. Although, the local client 112 has been shown with respect to client device 108-3, it would be understood that, each client device 108 would include a local client 112 to communicate with the privacy protection middleware system 104.

In operation, interest profiles of the end users based on the activities of the end users are generated and are saved locally by the local client 112 running on each client device 108. For example, the interest profiles of the end users may be generated based on profile information corresponding to the end users. The profile information, for example, may indicate websites visited by the end users, songs or videos played or downloaded by the end users, products used or services availed or reviewed by the end users, etc. Based on the generated interest profile, the local client 112 categorizes the end user in one or more pre-defined interest groups. Interest groups may be understood as groups of end users sharing similar interests and choices. In one implementation of the present subject matter, an exhaustive listing of all possible interest groups based on varied interest and liking of end users may be available with the local client 112.

Further, the local client 112 may be updated with such listings of interest groups and their classification parameters from time to time.

To ensure protection of privacy of the end users, techniques of profile slicing and sliced interest profile transmission to the privacy protection middleware system 104 are utilized by the local client 112. In one implementation, the profile information of the end users may be sliced in multiple segments by the local client 112, each segment comprising of one or more sets of key-value pair. The local client 112 may also ensure that no segment of the profile information of the end user by itself contains enough profile information that can be used to construct the complete interest prolife and infer the identity of the end user. Further, each segment of the end user interest profile and the group ids, indicative of the interest groups in which the end user has been characterized in, are sent by the local client 112 to the privacy protection middleware system 104.

Based on the one or more of the pre-defined interest groups identified for the end users, the local client 108 may transmit the relevant profile information corresponding to the end users to the privacy protection middleware system 104. For example, based on the profile information, the end users may have been categorized into several interest groups, such as movies, sports and e-books. The local client 112, based on the interest groups into which the end user has been categorized into, may send the relevant slices of the interest profiles to the associated interest groups. Since, each interest group may be hosted by a specific intermediary node of the privacy protection middleware system 104, slices of interest profiles associated with a particular interest group may be sent to the intermediate node hosting the particular interest group.

In one implementation of the present subject matter, the local client 112 of the end user may also associate the end users to an interest group based on applications utilized rather than interest and activities of the end users. For example, apart from activities of the end user and their interest gathered from different applications on the end users client device 108, the local client may associate the end user to an interest group based on location of the end user to provide location based recommendation service. It would be appreciated that in situations where an end user is associated to an interest group based on current location of the end user, the end user may receive recommendation services pertaining to the location of the end user. For example, a local client 112 of an end user utilizing LBS recommendation services may associate the end user to an interest group Paris when the end user is roaming in Paris. Similarly, the local client may also associate an end user to an interest group based on an online social network utilized by the end user. In would be appreciated by those skilled in the art that the interest groups correspond to different communities or social-circles that the end-user has subscribed to in the online social network.

As described before, the privacy protection middleware system 104 implements a de-centralized solution of distributed intermediary nodes for privacy protection of end users where the end users associated with same interest group ids rendezvous their user consumption data at some common intermediary node from among the pool of distributed intermediary nodes to receive personalized content and recommendation services. It would be understood that the user consumption data may include the relevant profile information corresponding to the end users that may in turn be a slice of the interest profile of the end user.

In such a situation, the profile information of any end user pertaining to movies may be sent to one intermediary node of the privacy protection middleware system 104 and profile information of any end user pertaining to sports may be sent to another intermediary node of the privacy protection middleware system 104. Hence, any intermediary node collecting profile information pertaining to any interest group is referred to as an interest group aggregator node of that interest group wherein each interest group aggregator node is assigned an identity number, referred to as aggregator node id. For the sake of simplicity, it is considered that the aggregator node id associated to an intermediary node is same as the interest group hosted by the intermediary node. For example, if the interest group id of the interest group pertaining to movies is 99, an intermediary node collecting information related to the interest group movies and associated interest group id 99 can be referred to as interest group aggregator node 99.

The intermediary nodes acting as interest group aggregator nodes for different interest groups, in one implementation, may collate the user consumption of all the associated end users to request for recommendation services and personalized content from the service provider 110 through the network 116-2. Since the local client 112 of each end user provides user consumption data to each of the associated interest group aggregator node, each interest group aggregator node may identify preferred categories of services availed by the end users belonging the interest group and provide it to the service provider 110 to obtain recommendation and personalized content.

According to an implementation of the present subject matter, each intermediary node of the privacy protection middleware system 104 may be implemented as a backend middleware system 114 to provide true privacy to the private and personal information of the end users. The backend middleware system 114 implemented by each of the intermediary nodes may facilitate secure communication between the local client 112 running on client devices 108 and the privacy protection middleware system 104. Further, the backend middleware system 114 may also allow communication between the privacy protection middleware system 104 and the service provider such that encrypted and un-encrypted communication is supported to allow use of wide range of applications and business models.

In one implementation of the present subject matter, the backend middleware system 114 may include multiple layers, instantiated with different frameworks to support multiple functionalities of the privacy protection middleware system 104. The functioning of different layers along with the frameworks utilized to provide the functionalities is described later in the description with respect to different figures.

Each intermediary node acting as interest group aggregator node for an interest groups provides personalized content and recommendation services to the end users. The intermediary node implemented as a backend middleware system 114 ensures by implementing various layers instantiate through various frameworks and techniques, described later in the specification, that the privacy of the end users is maintained and; protection middleware system 104 is unaware of the specific client devices 108 to which the recommended services are provided. In one implementation, the client device 108 may be configured to further process the received recommended services based on the interest profile corresponding to the end users so as to generate a customized recommendation of services for the end users. Details of implementation of the client device 108 and the privacy protection middleware system 104 have been described in conjunction with other figures later in the specification.

An exemplary privacy protection middleware system 104 is described with respect to FIG. 2(a) and FIG. 2(b) of the present subject matter.

FIG. 2(a) illustrates a privacy protection middleware system 104 implementing multiple intermediary nodes where each intermediary node implements backend middleware system 114, according to an embodiment of the present subject matter. In accordance with the present subject matter, the local client 112 and the privacy protection middleware system 104 are communicatively coupled to each other through the various components of the network 106. FIG. 2(b) illustrates the components of a backend middleware system 114 implemented at each intermediary node of the privacy protection middleware system 104. The various functionalities of the components of the backend middleware system 114 would be described in conjunction with different modules illustrated in FIGS. 2(a) and 2(b).

Further, as described before, the privacy protection middleware system 104 implementing multiple intermediary nodes may communicate with the local client 112 of end users through the network 106. In many cases, multiple network entities besides those shown may lay between the privacy protection middleware system 104 and the local client, including transmitting stations, switching stations, and communication links, although those have been omitted for brevity of present description. Similarly, various acknowledgement and confirmation network entities may also be omitted for the sake of clarity.

The backend middleware system 114 of the privacy protection middleware system 104 includes one or more processor(s) 202, interface(s) 204, and a memory, such as a memory 206, coupled to the processor(s) 202. In one embodiment, the described backend middleware system 114 may be implemented by intermediary nodes of the privacy protection middleware system 104.

The processor(s) 202 may be implemented as one or more microprocessors, microcomputers, microcontrollers, digital signal processors, central processing units, state machines, logic circuitries, and/or any devices that manipulate signals based on operational instructions. Among other capabilities, the processor(s) 202 are configured to fetch and execute computer-readable instructions stored in the memory 206.

The functions of the various elements shown in the figures, including any functional blocks labeled as "processor(s)", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included.

The interfaces 204 may include a variety of software and hardware interfaces, for example, interfaces for peripheral device(s), such as a keypad, user interface screen, and an external display. In one implementation, the interfaces 204 may couple each intermediary node to another intermediary node of the privacy protection middleware system 104. The interfaces 204 can also facilitate communications with the service provider 110 within a wide variety of networks and protocol types, including wireless networks such as Wireless LAN (WLAN), cellular, or satellite.

The memory 206 may include any computer-readable medium known in the art including, for example, volatile memory such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 includes modules 208 and data 210. The modules 208, amongst other things, include routines, programs, objects, components, data structures, etc., which perform particular tasks or implement particular abstract data types. The data 210 serves, amongst other things, as a repository for storing data processed, received and generated by one or more of the modules 208.

The modules 208 implement different functionalities to provide privacy protection to the private and personal information of end users. As described before, each backend middleware system 114 implements such functionalities by way of different layers. In one implementation, the modules 208 implement the functionalities implemented by the different layers by instantiating various frameworks.

The modules 208 further include, for example, a storage module 212, an application interface module 214, a routing module 216, a networking module 218, and other module(s) 220. The other modules 220 may include programs that supplement logic and routines on the backend middleware system 114. The data 210 includes data generated as a result of the execution of one or more modules 208, such as interest group id data 222, user consumption data 224, and other data 226. The interest group id data 222 may relate information associated with the interest group hosted by the backend middleware system 114 for the corresponding intermediary node. Further the user consumption data 224 may include data related to different end users associated with the interest group. Further, the other data 226 may include data generated by the other modules 220.

For the sake of simplicity, the different layers implemented by the backend middleware system 114 along with the corresponding modules to implement various functionalities and instantiate associated frameworks have been illustrated in FIG. 2(b). Although, the functionality of different layers is described with respect to certain modules, it would be appreciated that a combination of modules may be utilized to provide the functionality of one or more described layers. Further, it would also be appreciated that fewer modules than described to provide the functionality of the described layers.

Referring in conjunction to FIG. 2(b), the backend middleware system 114 includes different layers including, a network anonymization layer 250, a routing and mapping layer 252, an API layer 254, and a persistent storage layer. The network anonymization layer 250 enables the local client 112 of end users to communicate with the intermediary nodes of privacy protection middleware system 104 anonymously, without any requirement of data encryption where only the intended recipient can decrypt the data for viewing. On one hand, the anonymization network layer 250 supports anonymity of end users, on the other, also allows the backend middleware system 114 to anonymously deliver PUSH recommendations to end users. In one implementation, the anonymization layer 250 may communicate information based on client/relay based routing mechanism that allows thin clients to also utilize recommendation services while the relay enable heavy computing interim channels. In one implementation, the networking module 218 is configured to implement frameworks required for the implementation of the functionality supported by the network anonymization layer.

The routing and mapping layer 252 supports determination of an intermediary node corresponding to an interest group id. As described earlier, since different intermediary nodes cater to different interest groups and each intermediary node acts as an interest group aggregator node for an interest group, the routing and mapping layer 252 supports determination of the interest group aggregator node for every interest group. In one implementation, the routing module 216 implements frameworks required for the implementation of the functionality supported by the routing and mapping layer.

Similarly, the API layer 254 may enable interaction between the local clients and the intermediary nodes of the privacy protection middleware system 104. In one implementation, the application interface module 214 may implement frameworks and web services to support the functionality of the API layer 254. Further, the persistent storage layer 256 may store user consumption data 224 provided by the local client 112 of the end users based on their interest profiles. The implementation of the persistent storage layer 256 may allow the privacy protection middleware system 104 to cope up with the churns caused due to modification and updation in intermediary nodes. In another implementation, the storage module 212 may be configured to implement frameworks to support storage of user consumption data provided by the local client 112 of the end users.

In operation, the local client 112 of end users provides user consumption data 224 to the intermediary nodes of the privacy protection middleware system 104 to obtain personalized content and recommendation services. In one implementation, the networking module 218 instantiates a onion routing framework such as TOR to support the anonymous communication between the local client of the end users and the intermediary nodes of the privacy protection middleware system 104. Further, in one implementation, the application interface module 214 may be configured to implement various APIs based on web services to instantiate interaction between the local client of the end users and the intermediary nodes of the privacy protection middleware system 104. In said implementation, the application interface module 214 may support multiple APIs, such as, subscribe, upload, receive-PUSH-Recommendation, and look-up-PULL-Recommendation APIs as web services.

In an example, to provide user consumption data 224 of an end user, the local client 112 of the end user may upload a slice of the interest profile along with other information associated with an interest group, to the privacy protection middleware system 104. To this end, the local client 112 of the end user may invoke the web service upload API on an intermediate node of the privacy protection middleware system 104, where each intermediary node implements the backend middleware system 114. For reference purposes, the intermediate node receiving the slice of the interest profile from an end user is referred to as profile slice collector, for the exchange of information. In one implementation, the local client 112 may send the entire user consumption data 224 associated with one interest group, including slice of interest profile for the interest group, user details relevant to the interest group, and user preferences pertinent to the interest group at one instance to the privacy protection middleware system 104. In another implementation, the local client 112 may send the same user consumption data associated with the interest group in different segments, and at different instances.

In one implementation, to upload the slice of interest profile, an intermediate node may be randomly identified. For example, for an end user, say A, to upload the slice of interest profile to an interest group aggregator node 88, the local client 112 of the end user A may randomly select an intermediate node from amongst the multiple intermediary nodes. In such a scenario, the local client 112 of the end user A may select an intermediate node hosting interest group 200 or referenced as interest group aggregator node 200. It would be appreciated that, the interest group aggregator node 200 would be referred to as the profile slice collector for the user. Therefore, the local client 112 of the end user A may upload the slice of interest profile to the profile slice collector hosting interest group 200. It would also be appreciated that during different communications between the local client 112 of the end user and the privacy protection middleware system 104, intermediate node acting as the profile slice collector for the user may randomly change and may be anonymously determined. For example, for the end user A, after uploading the slice of interest profile associated with an interest group 88 to the interest group aggregator node 200, the local client 112 of the end user A may again upload another slice of the interest profile. The second slice of interest profile may now be associated with another interest group 500. To upload the second slice of the interest profile, the local client 112 of the end user A may now randomly indentify another intermediary node hosting interest group 17, or interest group aggregator node 17, as its profile slice collector.

Further, in said situations where the slice of interest profile for interest group aggregator node 88 is received by the interest group aggregator node 200, or the second slice of interest profile for interest group aggregator node 500 is received by the interest group aggregator node 17, the respective slice of interest profile may be forwarded to the relevant interest group aggregator node by the routing module 216 of the routing and mapping layer 252, based on DHT routing mechanism. The details of routing mechanism are specified later in the description.

In another implementation, to upload the slice of interest profile of the end user, intermediate nodes may be specifically allocated to each end user and, local client 112 of the end users may invoke APIs only through the allocated intermediate nodes. Further, in yet another implementation of the present subject matter, one specific intermediate node may be allocated as profile slice collector for all the end users for every communication between the end users and the privacy protection middleware system 104.

In one implementation of the present subject matter, the intermediate node randomly identified to be provided with the slice of interest profile of the end user, is contacted by the local client 112. As described before, to support anonymous communication between the end user and the intermediate node and, to protect the privacy of the end user, the communication between the end users and the privacy protection middleware system 104 is based on a framework instantiated by the network anonymization layer 250. In said implementation, the networking module 218 may instantiate the TOR framework for anonymous communication and receive the slice of interest profile of the end user through the TOR technique.

For example, the local client 112 of the end user may forward the slice of interest profile of the end user A to the randomly identified profile slice collector based on TOR technique through TOR servers. It would be understood by those skilled in the art that the TOR technique provides anonymous exchange of information between two entities by utilizing multiple intermediate hopping and routing server. Since the information is exchanged over encrypted channels, on one hand it provides security to the information and; on the other, it does not necessitate encryption of the information enabling wide range of applications and business models.

In one implementation, the TOR servers utilized for communication between the end users and the intermediate nodes may be implemented by the various intermediate nodes of the privacy protection middleware system 104 itself. In another implementation, worldwide available TOR servers may be utilized for the purpose of communication between the end users and the privacy protection middleware system 104.

The slice of the interest profile of the end user sent by the local client 112 to the profile slice collector through the TOR servers is obtained by the networking module 218 in the backend middleware system 114 through the exit node of the TOR overlay. As described before, the slice of the interest profile may then be routed to the interest group aggregator node by the routing module 216. In one implementation, the routing of information from one intermediate node to another intermediate node is enabled by the routing and mapping layer 252. In one implementation, the routing module 216 of the routing and mapping layer 252 may instantiate PASTRY® framework based on DHT routing technique for routing the information. For example, where for the end user A, the slice of interest profile associated with the interest group 88 and meant for the interest group aggregator node 88 is received by the interest group aggregator node 200, the routing module 216 may forward the slice of interest profile to the interest group aggregator node 200 through the PASTRY® framework based on DHT routing. Since the mechanism of DHT routing is well known in the art, the details of the mechanism have been omitted for the sake of brevity.

As described before, the persistent storage layer 256 of the backend middleware system implemented by an intermediate node may allow storage of information received from the end users. An interest profile aggregator node, upon receiving user consumption data including slice of profile information from different profile slice collectors through the routing module 216, may store the information through the persistent storage layer 256. The storage module 212 may implement, for example, a framework that supports de-centralized approach along with persistent storage capabilities, such as the CASSANDRA framework to allow storage of information.

Situations may occur where one or more different intermediary nodes of the privacy protection middleware system 104 are not capable of hosting their respective intermediary group. In such situations, the user consumption data 224 stored by these intermediary nodes could be lost and the service of providing personalized content and recommendation services could be interrupted. Therefore, in one embodiment, the storage module 212 of each intermediary node, stores the user consumption data of different end users.

In one implementation, the user consumption data 224 of different users associated with one particular interest group, apart from being stored in the user consumption data 224, is segmented and also replicated over multiple intermediary nodes. The segmentation of information and replication ensures elimination of situations of single point of failure. It would be appreciated that the segregation and replication of information ensures for any one intermediary node to not obtain the entire user consumption data 224 of another intermediary node, thereby eliminating chances of linkability attacks.

The implementation of the persistent storage layer 256 may allow the privacy protection middleware system 104 to cope up with the churns caused due to modification and updation in intermediary nodes of the privacy protection middleware system 104.

In operation, each intermediary node hosting a particular interest group may store the aggregated user consumption data 224 of different users for future instances, such as, when the user consumption data is lost by the intermediary node, or when the intermediary node is not down and another intermediary node initiates the hosting of the group. In such instances, retrieval of user consumption data from intermediary nodes through persistent storage layer data may allow quick and non-cumbersome collation rather than receiving the user consumption data again from all the end users. In other words, under churn, a new intermediate node should be able to retrieve the previously uploaded user consumption data of the interest group.

However, in one implementation, to prevent linkability attacks, such as a rare URL appearing in different groups, the user consumption data 224 may be segregated and stored on different intermediary nodes such that no single intermediary node receives the entire user consumption data of another intermediary node to view the entire persistent user consumption across that group. In said implementation, to ensure integrity of the user consumption data stored at different intermediary nodes, the intermediary node prior to storage of the user consumption data may also encrypt the data based on a group's symmetric encryption key where the user consumption data stored across different intermediary nodes can only be decrypted through the group's symmetric encryption key held by the intermediary node of that interest group.

It would further be appreciated that in situations of data corruption or loss of data at the intermediate node, the intermediate node may recover the user consumption data from different intermediate nodes based on the available group's symmetric encryption key. However, in situations where the intermediate node is down and not working, any other node assuming the hosting of the interest group of the down intermediary node should posses the group's symmetric encryption key to recover the user consumption data from different intermediate nodes through the persistent storage layer. For this purpose, each intermediate node may also communicate the group's symmetric key to one or more eligible intermediary node replicas, i.e., ones designated as per the DHT protocol using a DHT replication protocol such that the eligible intermediary node replica on hosting the interest group of the down intermediary node may retrieve the previously aggregated group consumption.

To improve resilience to intermediary node replicas acquiring several group symmetric keys, and assuming the role of an eligible replica, additional checks are incorporated to ensure access only by a primary intermediary node replica as compared to any intermediary node replica possessing the group's symmetric key. For this purpose, intermediate nodes querying the user consumption data may present a DHT neighborhood certificate to act as an interest group aggregator node of an interest group. The DHT neighborhood certificate can be verified dynamically by auditing the reported neighborhood. This mechanism coupled with standard DHT routing security mechanisms prevent a single intermediary node from viewing user consumption data of large number of groups, thereby preventing linkability attacks.

In one implementation, the persistent storage layer 256 may implement the CASSNDRA framework to store the user consumption data of an intermediary node across multiple different intermediary nodes of the privacy protection middleware system 102.

Further, the storage module 212 implementing the CASSANDRA framework segmenting and replicating data over different and multiple intermediary nodes allow data aggregation at later instances based on the group's symmetric key. This allows a new intermediary node to resume hosting of the interest group with minimal loss of the user consumption data 224. For example, in a situation, where an intermediary node is incapable of hosting an interest group, say interest group aggregator node 544 for the interest group 544. In such a situation, the user consumption data 224 associated with the interest group 544 would be stored with other intermediary nodes of the privacy protection middleware system 104 based on CASSANDRA framework. In case a new intermediate node overtakes the hosting of the interest group aggregator node 544, the intermediary node would be provided the user consumption data associated with the interest group 544 from the other intermediary nodes based on the CASSANDRA framework.

In another implementation, an interest profile aggregator node may also provide information to the end users. The information may either be provided at the instance a new or an updated user consumption data 224 is received by the interest profile aggregator node from an end user through the anonymous lookup procedure or at any later instance where the interest profile aggregator node wishes to provide (push) information to the end user.

In situations where the interest profile aggregator node receives a new or updated user consumption data 224 from an end user through the anonymous lookup procedure, the interest group aggregator node finally receiving the new or updated user consumption 224 data may respond by providing personalized content and recommendation services to the end user. It would be understood that the interest group aggregator node finally receiving the new or updated user consumption data 224 may be intermediary node hosting the interest group associated with the user consumption data 224. For example, when the local client 112 of the end user A may provide an updated location of the end user A to a randomly selected profile slice collector, say profile slice collector Ø; the routing module 216 of the profile slice collector may route the updated location of the end user A to the appropriate interest profile aggregator node hosting the interest profile of the updated location, say interest profile aggregator node α. In such situation, the interest profile aggregator node α may provide recommendation service related to places of interest near the updated location. For this purpose, the application interface module 214 of the interest profile aggregator node α may collate the required information to be provided to the end user A and, the routing module 216 of the interest profile aggregator node α may route the collated information to the profile slice collector Ø. The networking module 218 of the profile slice collector 218 may then provide the collated information to the end user A based on TOR mechanism through multiple TOR servers.

Similarly, an interest profile aggregator node may also provide information to the end users even when any updated user consumption data 224 is not received for the end user, for example, based on previously available user consumption data 224. Such situations may include, providing of information after every regular interval of time instances, providing subscription information, providing of recommendations to a user based on updated interest and liking of other similar interest holding end users, and the like. However, since the privacy protection middleware system 104 allows end users to anonymously communicate with the intermediary nodes, the identity of end users is unknown to the intermediary nodes and providing information directly to the end users based on their identity, or without an already established link between the end user and one of the profile slice collector is not possible.

Therefore, in such situation, to independently communicate with the end users, the API layer 254 and the network anonymization layer 250 may utilize TOR hidden services by instantiating TOR client and TOR hidden server at the local client of the user and, the backend middleware system 114, respectively. In operation, the application interface module 214 of the interest profile aggregator node may invoke a PUSH web service API. Further, upon instantiation of the PUSH API, the networking module 218 of the interest profile aggregator node may invoke local SOCKS proxy of the interest profile aggregator node based TOR mechanism to communicate with a hidden TOR server in the local client 112 of the end user. It would be understood by those skilled in the art that TOR mechanism along with allowing users to anonymously communicate with the each other, also allow the users to run a hidden TOR server to receive information anonymously. Hence, the networking module 218 communicates with the hidden TOR server run by the local client 112 and makes a call to the receivePUSHRecommendation web service API of the local client 112. The local client 112 to be communicated are identified based on a mailbox id associated with the local client 112 which is supplied to the interest group aggregator node while the local client 112 invokes the subscribe API for the first time. Hence, it would be appreciated that local clients 112 of the end users who have never invoked the subscribe API to provide any information to an interest group aggregator node would not be able to receive direct information from the interest group aggregator node.

Based on the above described system and methods, the privacy protection system 102 allows privacy protection of the end users while providing personalized content and recommendation services. The privacy protection system 102 allows anonymity of the end users through use of encrypted channels without requiring data encryption and thereby restricting the use of applications and business models. The privacy protection system 102 also removes possibilities of linkability attacks to the end users by implementation of de-centralized and distributed mechanism. Further, the privacy protection system 102 allows use of thin clients while supporting various application scenarios, such as, LBS, recommender systems, and OSNs.

FIG. 3(a) illustrates method 300 for providing privacy protection to end users, according to an embodiment of the present subject matter. The order in which the method 300 is described is not intended to be construed as a limitation, and any number of the described method blocks can be combined in any order to implement the method 300 or any alternative methods. Additionally, individual blocks may be deleted from the methods without departing from the spirit and scope of the subject matter described herein. Furthermore, the methods can be implemented in any suitable hardware, software, firmware, or combination thereof.

The method may be described in the general context of computer executable instructions. Generally, computer executable instructions can include routines, programs, objects, components, data structures, procedures, modules, functions, etc., that perform particular functions or implement particular abstract data types. The method may also be practiced in a distributed computing environment where functions are performed by remote processing devices that are linked through a communications network. In a distributed computing environment, computer executable instructions may be located in both local and remote computer storage media, including memory storage devices.

A person skilled in the art will readily recognize that steps of the methods can be performed by programmed computers. Herein, some embodiments are also intended to cover program storage devices, for example, digital data storage media, which are machine or computer readable and encode machine-executable or computer-executable programs of instructions, where said instructions perform some or all of the steps of the described method. The program storage devices may be, for example, digital memories, magnetic storage media such as a magnetic disks and magnetic tapes, hard drives, or optically readable digital data storage media. The embodiments are also intended to cover both communication network and communication devices configured to perform said steps of the exemplary methods.

Referring to FIG. 3, the method may be implemented by the privacy protection middleware system 102, according to an implementation of the present subject matter. At block 302, user consumption data, from a local client of one of a plurality of end users may be received through various mechanisms of anonymously routing data. In one example the user consumption data is received through client/relay based mechanism such as onion routing. In one implementation, the onion routing (TOR) mechanism may be utilized to allow anonymous communication between the local client and the intermediary nodes. The user consumption data may include a slice of interest profile, interest group Id. associated with the slice, preferences of the end user, and the like. The user consumption data may signify the interest of the user based on the various subscriptions, indulgence and activities of the end user. In one implementation, the user consumption data received from the local client of the end user is through the TOR mechanism and from a TOR exit server. Further, user consumption data may be received by a random intermediate node from amongst a plurality of intermediary nodes, referred to as profile slice collector. In another implementation, the user consumption data may be received while the end user is utilizing various application scenarios, such as, LBS, OSN, IPTV, and IP multimedia system (IMS).

At block 304, the user consumption data received by the profile slice collector is routed to an associated interest group aggregator node based on distributed hash table (DHT) routing mechanism. The DHT routing mechanism may allow anonymous routing of information among the intermediary nodes. Since different interest groups are hosted by different intermediary nodes, the user consumption data collected by the randomly selected profile slice collector is routed to the interest group aggregator node hosting the interest group associated with the user consumption data. In one implementation, the routing may be enabled through the PASTRY® framework implementing the DHT routing mechanism.

At block 306, the user consumption data is stored at the interest group aggregator node. In one implementation, the user consumption data is stored at the interest group aggregator node and correspondingly at one or more intermediary nodes so that in situations of churn, a new interest group aggregator should be able to retrieve the previously uploaded user consumption data of the interest group. Further, the stored user consumption data is such that each aggregator node can access only user consumption data of its own interest group. In other words, to prevent linkability attacks it is ensured that no single intermediary node has access to the entire persistent consumption across another interest group.

The storage of user consumption data by replication allows minimization of churns among the intermediary nodes and also ensures elimination of situations of single point of failure. In operation, to store user consumption data at different intermediary nodes, the user consumption data maybe segregated and encrypted based on a group's symmetric encryption key where the user consumption data stored across different intermediary nodes can only be decrypted through the group's symmetric encryption key held by the intermediary node of that interest group.

It would further be appreciated that in situations of churn due to data corruption or loss of data at the intermediate node, the intermediate node may recover the user consumption data from different intermediate nodes based on the available group's symmetric encryption key. However, in situations where the intermediate node is down and not working, any other node assuming the hosting of the interest group of the down intermediary node should posses the group's symmetric encryption key to recover the user consumption data from different intermediate nodes. For this purpose, each intermediate node may communicate the group's symmetric key to one or more eligible intermediary node replicas, i.e., ones designated as per the DHT protocol using a DHT replication protocol such that the eligible intermediary node replica on hosting the interest group of the down intermediary node may retrieve the previously aggregated group consumption.

In one implementation, the user consumption data is also replicated at one or more intermediary nodes from amongst a plurality of intermediary nodes based on CASSANDRA® framework. In one implementation, as described before, the replication occurs of segmented user consumption data over the one or more intermediary nodes to ensure recoverability from failure of single point of contact. Further, the CSSANDRA® allows coping from churns among the intermediary nodes due to modifications among the plurality of intermediary nodes.

At block 308, personalized content and recommendation service is provided to the end user. In one implementation, to provide personalized content and recommendation service, information is provided through TOR hidden service to the local client of the end user. In another implementation, the information is provided at the time when a new or updated user consumption data is received from the end user through anonymous lookup procedure. In situations where the new or updated user consumption data is received through anonymous lookup procedure, the interest group aggregator node may provide the information to the profile slice collector through which the updated user consumption data was received, to be provided to the end user.

Although embodiments for methods and systems for providing privacy to private and personal information of end users have been described in a language specific to structural features and/or methods, it is to be understood that the invention is not necessarily limited to the specific features or methods described. Rather, the specific features and methods are disclosed as exemplary embodiments for privacy protection of the end users.

We claim:

1. A method for privacy protection of end users in a network, the method comprising:
    receiving user consumption data, associated with at least one respective end user, wherein the user consumption data comprises a respective slice of a respective interest profile of the at least one respective end user and a respective associated interest group id of the respective slice of the respective interest profile, and wherein the user consumption data is received through a network anonymization layer;
    routing the user consumption data to an interest group aggregator node from amongst a plurality of intermediary nodes based on a distributed hash table (DHT) routing mechanism, and wherein the interest group aggregator node is associated with the respective associated interest group id present in the user consumption data;
    storing the user consumption data through a persistent storage layer to cope with churn due to modifications among the plurality of intermediary nodes
    encrypting segments of the user consumption data based on a group's symmetric encryption key; and
    storing the encrypted segments on one or more intermediary nodes from amongst the plurality of intermediary nodes to replicate the user consumption data over the one or more intermediary nodes, wherein the group's symmetric encryption key is unique for each intermediary node from amongst the plurality of intermediary nodes, and wherein the group's symmetric encryption key of each intermediary node is replicated to the one or more intermediary nodes.

2. The method as claimed in claim 1, wherein the network anonymization layer is based on an onion routing framework, wherein the onion routing framework provides anonymous communication between a local client of the at least one respective user and the plurality of intermediary nodes.

3. The method as claimed in claim 1, the method further comprising receiving instructions from a local client of an end user from amongst the at least one respective user based on Simple Object Access Protocol (SOAP) through an application programming interlace (API) layer, wherein the local client utilizes web services APIs to send the instructions, and wherein the instructions are indicative of information associated with the end user.

4. The method as claimed in claim 1, wherein the routing and mapping layer is based on PASTRY framework implementing the DHT routing mechanism, wherein the PASTRY framework provides routing of data among the plurality of intermediary nodes.

5. The method as claimed in claim 1, wherein the receiving comprises collecting the user consumption data from a local client of an end user from amongst the at least one respective end user, by a profile slice collector node, randomly selected from amongst the plurality of intermediary nodes.

6. The method as claimed in claim 1, wherein the method further comprises providing information to a local client of an end user from amongst the at least one respective end user based at least on the received user consumption data, wherein the information is indicative of personalized content and a recommendation service provided to the end user based on the user consumption data.

7. The method as claimed in claim 6, wherein the information is provided by the interest group aggregator node to the local client based on a TOR (The Onion Router) hidden services to a hidden TOR server run by the local client.

8. The method as claimed in claim 1, wherein the method further comprises:
receiving anonymous lookup call from a local client of an end user from amongst the one or more end users through an anonymous channel, wherein the anonymous call is received by a random intermediary node from amongst the plurality of intermediary nodes; and
providing information to the local client through the random intermediary node via a reverse path over anonymous channel.

9. A privacy protection system to protect privacy of end users in a network comprising a privacy protection middleware system connectable to at least one local client, wherein the privacy protection middleware system includes a plurality of intermediary nodes, at least one intermediary node implementing a backend middleware system comprising:
a processor and
a memory coupled to the processor, the memory carrying instructions which when executed by the processor cause the processor to act as:
a networking module configured to receive user consumption data, from the at least one local client of at least one respective end user, wherein the user consumption data comprises a respective slice of a respective interest profile of the at least one respective end user and a respective associated interest group id of the at least one respective end user, and wherein the user consumption data is received through a network anonymization layer;
a routing module configured to route the user consumption data to an interest group aggregator node from amongst the plurality of intermediary nodes based on a distributed hash table (DHT) routing mechanism, wherein the interest group aggregator node is associated with the respective associated interest group id of the user consumption data; and
a storage module configured to store the user consumption data through a persistent storage layer to cope with churn due to modifications among the plurality of intermediary nodes wherein the storage module is further configured to:
encrypt segments of the user consumption data based on a group's symmetric encryption key; and
store the encrypted segments on one or more intermediary nodes from amongst the plurality of intermediary nodes to replicate the user consumption data over the one or more intermediary nodes, wherein the group's symmetric encryption key is unique for each intermediary node from amongst the plurality of intermediary nodes, and wherein the group's symmetric encryption key of each intermediary node is replicated to the one or more intermediary nodes.

10. The privacy protection system as claimed in claim 9, wherein the networking module is configured to exchange information based on a TOR (The Onion Router) mechanism.

11. The privacy protection system as claimed in claim 9, wherein the memory further carries instructions which when executed by the processor cause the processor to act as an application interface module configured to receive instructions from the at least one local client based on web services through an application programming interface (API) layer, wherein the instructions are indicative of information associated with the end user.

12. The privacy protection system as claimed in claim 11, wherein the application interface module supports at least one or more of subscribe, upload, receivePUSHRecommendation, and lookupPULLRecommendation APIs.

13. The privacy protection system as claimed in claim 9, wherein the networking module is further configured to provide information to the at least one local client based on TOR (The Onion Router) hidden services through a hidden TOR server of the at least one local client, and wherein a communication between the networking module and the hidden TOR server is based on a mailbox id associated with the at least one local client.

14. A non-transient computer-readable medium having embodied thereon a computer readable program code for executing a method comprising:
receiving user consumption data, associated with at least one respective end users, wherein the user consumption data comprises a respective slice of a respective interest profile of the at least one respective end user and a respective associated interest group id of the respective slice of the respective interest profile, and wherein the user consumption data is received through a network anonymization layer;
routing the user consumption data to an interest group aggregator node from amongst a plurality of intermediary nodes based on a distributed hash table (DHT) routing mechanism, and wherein the interest group aggregator node is associated with the respective associated interest group id present in the user consumption data;
storing the user consumption data through a persistent storage layer to cope with churn due to modifications among the plurality of intermediary nodes;
encrypting segments of the user consumption data based on a group's symmetric encryption key; and
storing the encrypted segments on one or more intermediary nodes from amongst the plurality of intermediary nodes to replicate the user consumption data over the one or more intermediary nodes, wherein the group's symmetric encryption key is unique for each intermediary node from amongst the plurality of intermediary nodes, and wherein the group's symmetric encryption key of each intermediary node is replicated to the one or more intermediary nodes.

* * * * *